United States Patent [19]

Sudano, Jr. et al.

[11] Patent Number: 5,039,170

[45] Date of Patent: Aug. 13, 1991

[54] RESONANT BEAM SUSPENSION PADS

[75] Inventors: Philip Sudano, Jr., Sparks; Michael R. Sudano, Reno, both of Nev.

[73] Assignee: Reno Salvage Co., Reno, Nev.

[21] Appl. No.: 540,958

[22] Filed: Jun. 20, 1990

[51] Int. Cl.$^5$ .............................................. E21C 47/00
[52] U.S. Cl. ........................................ 299/37; 299/14; 404/90; 173/139
[58] Field of Search ....................... 404/90; 299/37, 14

Primary Examiner—Ramon S. Britts
Assistant Examiner—Nancy P. Connolly
Attorney, Agent, or Firm—Townsend and Townsend

[57] ABSTRACT

A pad (22) for isolating a weight (4) from vibration of a resonant beam (8) in a resonant beam support system (6) for dissipating heat. The pad is constructed of a rubber-like material having ridges (58) and grooves (60). The ridges and grooves include a trapezoidal configuration which yields an increasing resistance to compression, i.e., spring rate, with increasing deflection. Altering the configuration of the ridges and grooves permits variation in spring rate. The pads may be constructed of standard truck tire recap tread and arranged in a square configuration. Water is injected between the pads and grooves through inlets (50, 52) to cool the pads. An aluminum plate (48) is mounted between first and second layers (40, 41) of tire recap tread to increase heat dissipation.

31 Claims, 3 Drawing Sheets

RESONANT BEAM SUSPENSION PADS

BACKGROUND OF THE INVENTION

The present invention relates to a suspension pad for a resonant beam support system.

A resonant beam support system provides a vertical impact system, for example, to break pavement or prepare the ground for construction or other uses by tamping beneath a mobile vehicle. The vehicle includes a resonant beam supported at its nodes and excited at one end near its resonant frequency. A tool projects downwardly from the output end of the beam to break the pavement or tamp the ground. A large weight is superimposed over the forward node of the beam to counteract the reaction forces of the tool striking the underlying surface. The weight is suspended from the vehicle so that the reaction forces are not transmitted by the weight to the vehicle, thereby isolating the vehicle from the reaction forces.

U.S. Pat. No. 4,515,408 entitled "Counterweight Support For Resonantly Driven Tool" issued on May 7, 1985 describes a mechanism for positioning the weight relative to the resonant beam in a resonantly driven impact system, the disclosure of which is incorporated by reference. The weight is linked to the resonant beam at the node proximate the output end of the beam. A member is fastened to the weight and extends to a position adjacent the node of the beam proximate the input end of the beam. A recess is formed in the lower portion of the weight and includes a plate located therein. As the beam oscillates, pads constructed of a resilient, deformable material intermediate the plate and the walls of the recess provide a large bearing surface for the weight so that the weight can absorb large reaction forces transmitted by the tool through the beam. The resiliency of the pads allows for vibratory movement of the beam relative to the weight.

The incompressibility of the resilient, deformable pads results in a non-linear resistance to compression, i.e., a non-linear spring rate. This occurs because the fixed volume of the pad must expand laterally as it is compressed vertically. Thus, only deflections of small magnitude occur at the true spring rate as determined by the elastic modulus of a given rubber compound. However, further deflection is resisted by tensile forces in the mass as it expands in other directions. As a block of rubber is compressed between its top and bottom faces, these tensile forces increase progressively from the center to the outer lateral surfaces. The material at the center of the pad is latterly restrained by the entire outer mass. The center of the pad exhibits the greatest resistance to compression, or in other words, the greatest spring rate. The overall spring rate is equivalent to the summation of the component forces at each position.

Rapid repetition of compression and relaxation creates internal friction in the rubber, causing a buildup of heat. The amount of heat energy required to raise rubber one degree is equal to approximately one-third of the amount of heat energy required for increasing water temperature by the same amount. Rubber, being a poor conductor of heat, allows this buildup to continue to destruction of the pads. The buildup of heat also increases the volume of material from thermal expansion which can add to the compression and hasten failure. As the temperature of the rubber is raised, the elastic modulus is lowered. Because the resonant beam support system requires a constant, exact and consistent spring rate, solid rubber pads do not provide optimum concrete breaking action for the resonant beam support system or adequate life of the pads themselves.

SUMMARY OF THE INVENTION

The present invention relates to a device for isolating a weight from the vibration of a resonant beam in a resonant beam support system. The support system comprises a substantially planar pad having a pair of layers constructed of a rubberlike material. Each layer includes a plurality of outwardly directed ridges with grooves formed between adjacent ridges. The ridges are spaced so as to provide room for elastic flow of the material into the grooves upon compression of the pads. A metallic core, preferably aluminum, is located between the layers.

The present invention extends the life of the pads by dissipating heat created during compression. Expansion of the ridges into the grooves reduces internal friction, minimizing increased volume, thereby resulting in a reduced buildup of heat within the pad. Additionally, the aluminum core is an excellent heat conductor, drawing heat from the surface of the pad. In the preferred embodiment the core is exposed around the periphery of the pad to facilitate heat dissipation.

The ridges and grooves of the pads preferably include a trapezoidal configuration which yields an increasing resistance to spring rate with increasing deflection. Altering the configuration of the ridges and grooves permits variation in spring rate. The amount of change is governed by the slope of the lateral faces of the ridges and grooves. The pads are preferably constructed of standard truck tire recapped treads. Because heat destroys automobile or truck tires, tire tread design provides an excellent configuration to combat heat buildup for pads employed in a resonant beam support system. Much development work in the area of tire tread has lead to the present designs, affording a long cycle life for these pads.

The pads may be arranged such that upper and lower pads are disposed on either side of a support plate for the resonant beam. In the preferred embodiment, there are a greater number of upper pads than lower pads, the upper pads preferably being arranged in a square or rectangular configuration. Water is sprayed through a pair of water inlets opposed to each other in spaces between the upper pads so as to cool the pads and further dissipate heat. A hole formed in the plate allows water to flow from the upper pads and accumulate between the lower pads, cooling both the upper and lower pads. Additional heat may be dissipated by holes formed in the first and/or second layers of the pads to partially expose the metallic core.

Other features and advantages of the invention will appear from the following description in which the preferred embodiment has been set forth in detail in conjunction with the accompanying drawings.

DETAILED DESCRIPTION OF THE PREFERRED EMBODIMENTS

Figure 1:
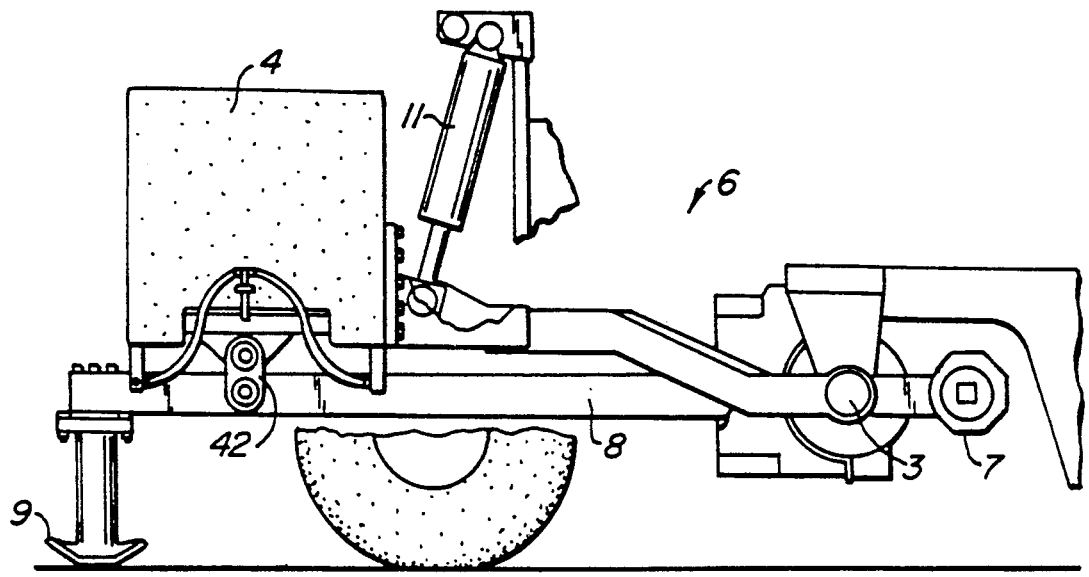
FIG. 1 is a fragmentary elevation view of the vertical impact system with a portion broken away.
Figure 2:
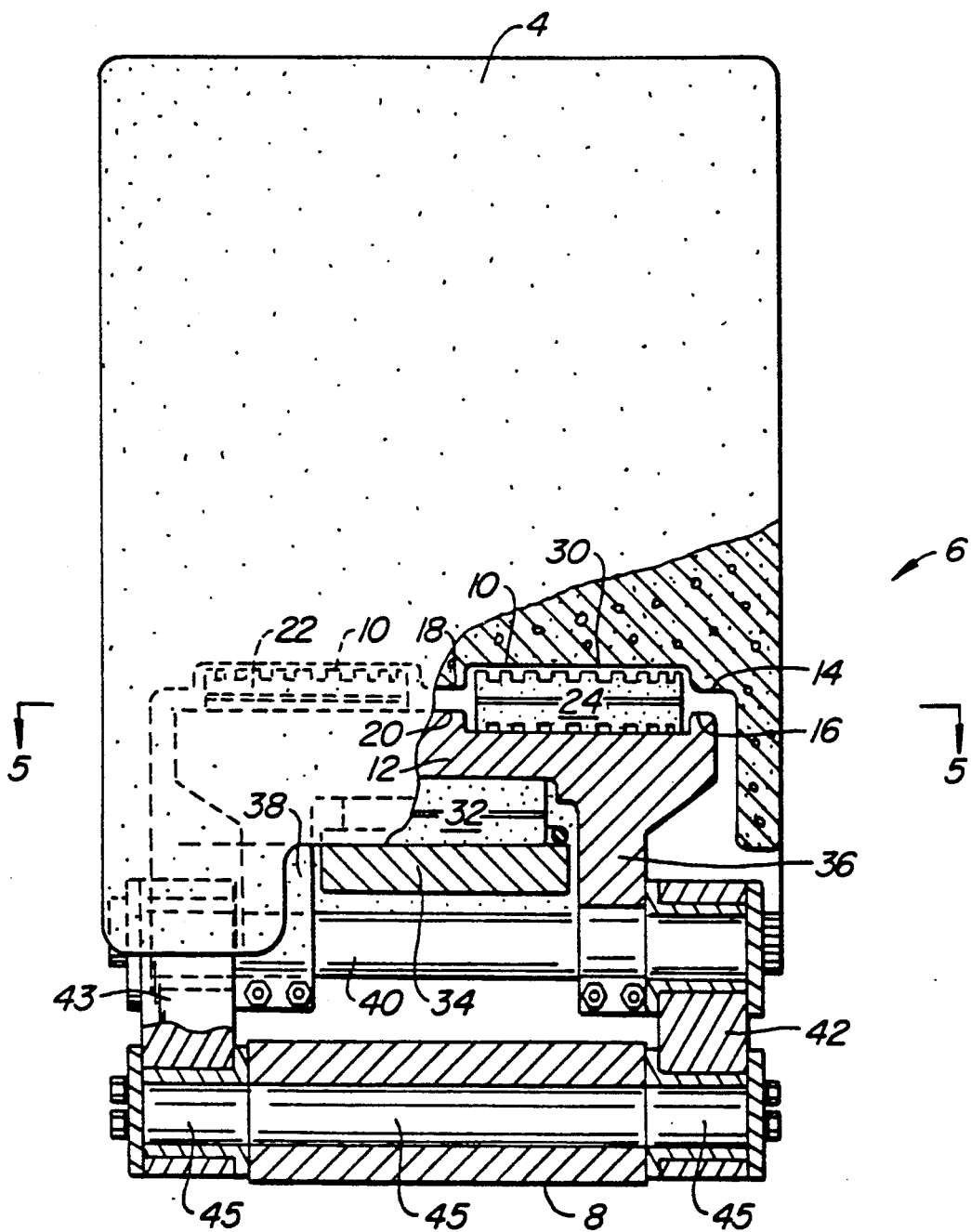
FIG. 2 is a fragmentary front elevation view showing the attachment of the weight to the beam mounted in conjunction with the pads of the present invention.

A preferred embodiment of a pad arrangement for coupling a resonant beam 8 to a weight 4 in a resonant beam support system 6 is illustrated in FIGS. 1-5. The resonant beam support system 6 is mounted on a vehicle as illustrated in FIGS. 1 and 2. Resonant beam 8 is supported at its nodes by a shaft 3 and a pair of links 42, 43 and is vibrated at one end by an oscillator 7 near the resonant frequency of the beam. As resonant beam 8 vibrates, a tool 9 extending downwardly from the forward end of the resonant beam reciprocates with the beam to break the pavement or tamp the ground. Weight 4 is superimposed over the forward node of the beam to counteract the reaction forces of tool 9. Weight 4 is suspended from the vehicle by a unidirectional hydraulic cylinder 11 so that the reaction forces are not transmitted by the weight to the vehicle, thereby isolating the vehicle itself from the reaction forces.

The overall structure of the attachment of weight to resonant beam 8 is illustrated in FIG. 2. A recess 10 is formed in the lower portion of weight 4 and a plate 12 is located in the recess. Plate 12 includes a pair of downwardly projecting stirrups 36, 38 which attach to a transverse pin 40. Links 42, 43 are fixed to the respective ends of pin 40 and connect pin 40 to a pin 45 projecting transversely through resonant beam 8 at its forward node location. Recess 10 and plate 12 have complementary pairs of abutments such as 14, 16 and 18, 20 which define a plurality of cavities overlying plate 12, each for receiving a resilient deformable pad 22, 24, 26, 28. A slight vertical gap 30 on the order of 1/16 to ⅛ inch is provided to allow movement of weight 4 with respect to resonant beam 8.

Upper pads 22, 24, 26 and 28 essentially isolate weight 4 from the high frequency vibrations of resonant beam 8. The upper pads provide a large surface area through which the downward force of weight 4 can be imposed on the resonant beam to counteract the reaction forces as tool 9 impacts the surface. Lower pads 32, only one of which is illustrated in FIG. 2, are located beneath plate 12 overlying cross member 34 to vertically support the forward portion of resonant beam 8 when the resonant beam is not in operation, i.e., when the upward reaction forces from the tool 9 do not force the resonant beam upwardly against weight 4.

The preferred embodiment includes a greater number of upper pads 22, 24, 26, 28, than lower pads 32. There are four upper pads arranged in a square configuration, as seen in schematic in FIG. 5. Two corresponding lower pads 32 are disposed beneath the upper pads. Water is injected through a pair of water inlets 50, 52 opposed to each other in spaces 54 between the upper pads so as to dissipate heat and cool the pads. At least one hole 56 formed in plate 12 allows water to flow from the upper pads and cool the lower pads.

Figure 3:
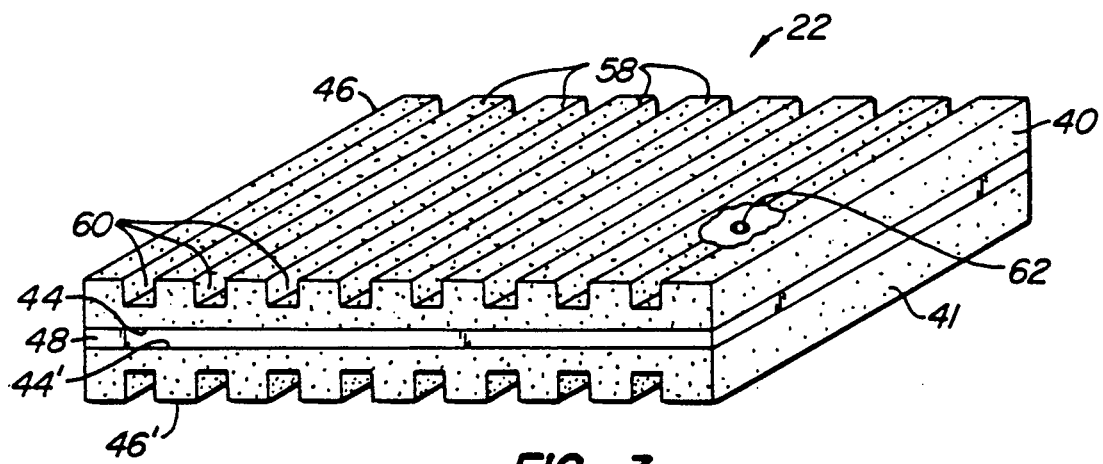
FIG. 3 is a perspective view of the pads shown in FIG. 2.

Referring now to FIG. 3, each of the upper and lower pads is constructed in a similar manner which will now be described with reference to a single pad 22. A first facing layer 40 and a second facing layer 41 are constructed of resilient deformable rubberlike material. Each facing layer includes an inward side 44, 44' facing the center of pad 22 and an outward side 46, 46' facing the outer edge of the pad. Outwardly directed ridges 58 and grooves 60 are formed in outward sides 46, 46'. A metallic core 48 in the form of an aluminum plate is sandwiched between first and second facing layers 40, 41 and attached to inward sides 44, 44' by a suitable adhesive. The metallic core may include a honeycomb or lattice construction. The periphery of core 48 is exposed to promote heat dissipation. Transverse holes 62 through which coolant water passes may be formed in the facing layers 40, 41 to further expose metallic core 48.

Figure 4:
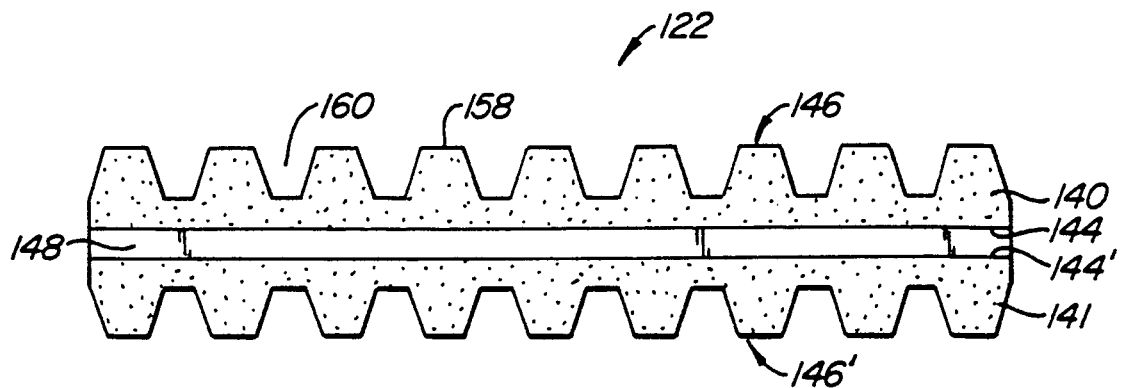
FIG. 4 is an elevation view of an alternate embodiment of the pad.
Figure 5:
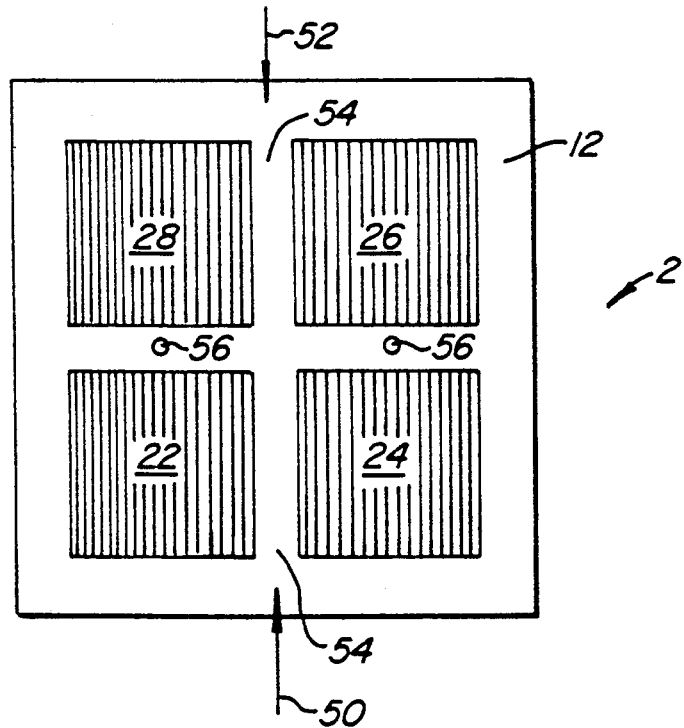
FIG. 5 is a schematic view of the layout of the upper pads of the present invention taken along line 5-5 of FIG. 2.

FIG. 4 illustrates an alternate pad embodiment 122 having a trapezoidal ridge configuration with the base of each ridge 158 having a larger dimension than the tip. Like reference numerals correspond to like reference numerals of pad 22 incrementally increased by 100. The trapezoidal ridge configuration yields an increasing resistance to spring rate with increasing deflection. Altering the configuration of ridges 158 permits variation in spring rate. It has been found that standard truck recap tread, pressed flat, provides effective resilient layers 140, 141 with appropriate spring rates and effective cooling.

In operation, during breaking or tamping operations, reaction forces from tool 9 striking the underlying surface are transmitted through resonant beam 8 and various links to plate 12. The deformability of resilient pads 22, 24, 26, 28 and 32, together with vertical gap 30 dampen high frequency vibrations but transmit the reaction forces to weight 4. The reaction forces are substantially absorbed by weight 4, and not transmitted to the vehicle as a whole.

As resonant beam 8 vibrates and reciprocates, ridges 58 compress such that the rubberlike material expands into grooves 60 to minimize internal heat buildup, and prolong pad life. The preferred trapezoidal configuration of the ridges controls the progressive change in spring rates as the pads compress. Heat is dissipated through aluminum plate 48, which has high thermal conductivity. Water is injected at high speed through inlets 50, 52 in spaces 54 to further cool the pads. The water flows through holes 56 to cool the lower pads.

This invention has been described with reference to the preferred embodiments. Variations and modifications can be made without departing from the scope of the present invention, which is limited only by the following claims.

What is claimed is:

1. A device for isolating a weight from vibration of a resonant beam in a resonant beam support system comprising a substantially planar pad having a first and a second layer each constructed of rubberlike material and each having a first side and a second side, each layer including a plurality of ridges formed on said first side and having a groove formed between adjacent ridges, said ridges being spaced so as to provide room for elastic flow of said material into said grooves, a metallic core located between the first and second layers and affixed to said second sides of said layers, said pad being disposed adjacent to the weight to isolate the weight from high frequency vibrations of the resonant beam.

2. The device as defined by claim 1 wherein said ridges have a trapezoidal cross section such that the base of each said ridge has a dimension larger than the tip.

3. The device as defined by claim 1 comprising a plurality of pads configured in a square arrangement adjacent to the weight.

4. The device as defined by claim 1 wherein said first and second layers are constructed of tire recap treads.

5. The device as defined by claim 1 wherein the metallic core is exposed around the periphery of the pad.

6. The device as defined by claim 1 including a plurality of pads and further comprising a water inlet for injecting water between said pads for dissipating heat.

7. The device as defined by claim 5 comprising a plurality of upper pads, a plate disposed beneath said upper pads and a plurality of lower pads disposed beneath said plate.

8. The device as defined by claim 6 wherein said water inlet is disposed between said upper pads.

9. The device as defined by claim 6 comprising a pair of water inlets disposed between said upper pads and opposed with respect to each other so that the water streams intersect.

10. The device as defined by claim 8 wherein said plate includes a hole formed therein such that the water flows from said upper pads to said lower pads.

11. A pad for isolating a resonant beam from a resonant beam support system comprising:
a first and a second layer of rubberlike material, each having an inward side in facing relationship and an outward side opposite said inward side, a plurality of ridges formed on said outward side with grooves formed between adjacent ridges, said ridges being spaced so as to provide room for elastic flow of said material into said grooves;
a metallic core disposed between said first and second layers contiguous with the inward sides of each of said first and second layers for dissipating heat; and
means for adhering the first and second layers to the metallic core.

12. The pad as defined by claim 11 wherein said metallic core comprises an aluminum plate.

13. The pad as defined by claim 11 wherein said core comprises a honeycomb construction.

14. The pad as defined by claim 11 wherein said first and second layer are constructed of tire recap treads.

15. The pad as defined by claim 11 wherein at least one of said first and second layers includes holes formed therein for partially exposing said core to thereby increase heat dissipation.

16. A device for isolating a weight from vibration of a resonant beam in a resonant beam support system comprising:
a plurality of pads constructed of a rubberlike material disposed in proximity to the resonant beam to thereby isolate the weight from high frequency vibrations of the resonant beam; and
a water inlet for injecting water between said pads for dissipating heat.

17. The device as defined by claim 16 wherein said plurality of pads comprises a plurality of upper pads and a plurality of lower pads, said water inlet disposed between said upper pads.

18. The device as defined by claim 16 comprising a pair of water inlets disposed between said upper pads and opposed with respect to each other so that the water streams intersect.

19. The device as defined by claim 16 further comprising a plate disposed between said upper and lower pads, and a passage formed in said plate for passage of water from between said upper pads to said lower pads.

20. The device as defined by claim 16 wherein said pads are constructed of tire recap tread.

21. A device for isolating vibration of a resonant beam from a weight in a resonant beam support system comprising:
a plurality of upper pads and a plurality of lower pads disposed adjacent to the resonant beam to thereby isolate the weight from high frequency vibrations of the resonant beam, said upper and lower pads each constructed of a rubberlike material, each pad including a first layer and a second layer having a metallic core disposed between said first and second layers, a plurality of ridges formed in one side of said first and second layers, a groove formed between adjacent ridges, said ridges being spaced so as to provide room for elastic flow of said material into said grooves; and
a pair of opposed water inlets for injecting water between said pads for dissipating heat.

22. The device as defined by claim 21 wherein said ridges having a trapezoidal cross section such that the base of each said ridge has a dimension larger than the tip.

23. A method for isolating vibration of a resonant beam from a weight in a resonant beam support system comprising the steps of:
selecting pads having ridges and a groove formed between adjacent ridges on a first outer pad side; and
positioning said pads substantially parallel to and in proximity to the weight to isolate the weight from high frequency vibrations of the resonant beam.

24. The method as defined by claim 23 further comprising the step of dissipating heat by spacing said ridges and grooves so as to provide room for elastic flow of the material forming the ridges.

25. The method as defined by claim 23 wherein said step of selecting said pads comprises selecting pads each having a central metallic core exposed around the periphery of the pad.

26. The method as defined by claim 25 further comprising the step of injecting water between said pads and grooves so as to further dissipate heat.

27. The method as defined by claim 23 wherein said step of selecting pads comprises selecting tire recap treads including a trapezoidal cross section having a variable spring rate.

28. The method as defined by claim 23 wherein said step of positioning said pads comprises arranging said pads in a square arrangement.

29. The method as defined by claim 23 wherein said step of positioning said pads comprises arranging a plurality of upper pads above a plurality of lower pads.

30. The method as defined by claim 29 including the step of arranging a greater number of upper pads than lower pads.

31. The method as defined by claim 29 further comprising the step of injecting water between said upper pads so as to further dissipate heat.

* * * * *